United States Patent [19]

Nitzberg et al.

[11] Patent Number: 4,779,638
[45] Date of Patent: Oct. 25, 1988

[54] BREAKAWAY SWIVEL COUPLING

[75] Inventors: Leonard R. Nitzberg, Knoxville, Tenn.; Paul D. Carmack, Tipp City, Ohio

[73] Assignee: Helix Enterprises, Inc., Knoxville, Tenn.

[21] Appl. No.: 107,947

[22] Filed: Oct. 13, 1987

[51] Int. Cl.$^4$ .............................................. F16K 17/14
[52] U.S. Cl. ...................... 137/68.1; 285/2; 285/69; 285/272
[58] Field of Search ...................... 137/68.1; 285/1, 2, 285/68, 69, 272, 317

[56] References Cited

U.S. PATENT DOCUMENTS

| | | | |
|---|---|---|---|
| 249,128 | 11/1881 | Westinghouse, Jr. | 285/68 |
| 1,118,107 | 11/1914 | Clasen | 285/1 |
| 2,452,430 | 10/1948 | Clark et al. | 285/1 |
| 3,741,521 | 6/1973 | Tatsuno | 137/68.1 |
| 4,354,522 | 11/1982 | Bormioli | 285/1 |
| 4,646,773 | 3/1987 | Klop et al. | 137/68.1 |

Primary Examiner—A. Michael Chambers
Attorney, Agent, or Firm—Alan Ruderman

[57] ABSTRACT

A tensile force actuated fuel line quick disconnecting coupling device has a pair of body members including interlocking elements which cooperatively couple and provide a fuel passageway through the body members, and uncouple when a tensile force above a predetermined limit is interposed on the fuel line. The interlocking elements may be in the form of a mortise and tenon connection having a detent type infrangible locking member for interconnecting the elements together. The interlocking elements may pivot one relative to the other so that a combination swivel joint and quick disconnecting coupling device is provided. Various types of interlocking members are disclosed as are both infrangible and frangible locking means. Valving is disposed within each body member so that when the body members uncouple respective valves close the flow passageways therein. The valving may include cylindrical stems which abut and open the passageways when the body members are coupled and additionally permit pivoting of one body member relatively to the other.

38 Claims, 4 Drawing Sheets

BREAKAWAY SWIVEL COUPLING

BACKGROUND OF THE INVENTION

This invention relates to a fluid line swivel joint connector having a quick disconnectable coupling for uncoupling and shutting flow of the fluid through the line, and more particularly to a swivel joint connector for mounting in a fuel supply line of a fuel dispensing station, the swivel joint permitting a dispensing nozzle to pivot relative to the fuel line or permitting a first section of the line to pivot relative to another section, and having detachable means which quickly decouples to shut flow communication at the joint when the tensile load at the joint is above a predetermined level. The invention is additionally directed to a detachable coupling wherein the tensile force due to a pulling on the line, and the hydrostatic forces of the fluid within the coupling are resisted independently and are not cummulative in the coupling, whereby the uncoupling occurs solely as a result of excessive tensile load.

It is known in the fuel dispensing art to include a swivel connector at the dispenser/hose interface so that twisting loads applied to the dispenser are not transmitted to the hose resulting in twisting thereof. Such swivels merely permit the dispenser, such as a fuel dispensing nozzle, to be pivoted about one or more axes relative to the axis of the hose, the swivel permitting flow communication means between the hose and the dispensing device.

Additionally, it is known to utilize quick disconnect or breakaway couplings in the fuel line spaced from the dispenser so that if a vehicle is driven away from the fuel dispensing station before the dispensing nozzle is removed from the filler neck of the vehicle, an uncoupling will result, shutting the flow of fuel and preventing the volatile fuel to be spilled due to either a dislodging of the moorings of the fuel dispensing station, breakage of the hose, or other failure of the fuel dispensing system. The prior art has proposed a number of decouplers which are actuated by a tensile force in the line. A frangible or shear pin has been proposed and utilized in a number of devices, one such device being illustrated in U.S. Pat. No. 3,719,194. Additionally, at least one other device utilizes an infrangible decoupler, such as a groove with spring-loaded detent balls retained together by a collar and uncoupled when a tensile force of predetermined amount is applied to the collar, this device being illustrated in U.S. Pat. No. 4,617,975.

In these and the other known quick disconnects the decoupling units are axially or straight flow through devices which are placed in the fuel line generally a short distance from the fuel dispenser. These devices have not been utilized in or attached to the dispensing nozzle since this would subject them to lateral forces resulting in premature uncoupling of the device, thereby creating a substantial nuisance situation.

Additionally another nuisance situation could occur where the device would uncouple resulting from spike line pressure shock forces when the dispensing nozzle is snapped shut. The rapid shutting of flow resulting in such decoupling is known as snap decoupling. Although most of the known decoupling devices perform satisfactorily when subjected to a small number of snap-off tests, after a substantial number of such rapid shut-offs, a breakage of shear pins and the like may occur. To forestall this occurrence the prior art reduced the cross sectional area in the line so as to reduce the pressure shock forces, but this of course reduces the fuel flow and creates a nuisance since the time for dispensing a quantity of fuel is increased.

Another design defect of the prior art decouplers or breakaways results from the cummulative affect of the tensile pull on the fuel line in which the decoupling devices are mounted and the hydrostatic forces produced by the pressurized liquid carried therein. In the known decouplers the hydrostatic forces are exerted axially in the same direction as the tensile forces, and thus so too are the line shock or pressure-spike forces. Since all three forces are exerted in the same direction, the affect is cummulative. Statutory regulations and insurance underwriters dictate the maximum amount of force transmitted to a ground mounted dispensing station. However, with typical hydrostatic pressures a fuel dispensed through conventionally sized fuel lines and subjected to typical momentary line shocks, it may not be possible with conventional systems to provide the decoupling device with a capability of resisting the recommended maximum detachment force set by certification agencies and yet to uncouple below the maximum tensile force permitted to be transmitted to the dispensing station.

SUMMARY OF THE INVENTION

Consequently, it is a primary object of the present invention to provide a fluid line swivel joint connector having a quick disconnectable coupling for uncoupling and shutting fluid flow through the line when the tensile force on the line is above a predetermined level.

It is another object of the present invention to provide a fuel line connector having a quick disconnectable coupling device for uncoupling and shutting flow through the line when the tensile force due to a pull on the line is above a predetermined level, the device having means for resisting the hydrostatically generated forces of the fuel independently of means for resisting the tensile forces resulting from line pull such that the fuel generating forces and the tensile forces are not cummulative.

It is further object of the present invention to provide a swivel joint connector for mounting in a fluid supply line of afuel dispensing station, the connector having detachable means for uncoupling when the tensile load at the joint is above a predetermined level.

It is a still further object of the present invention to provide a combination swivel joint quick disconnect coupling device for the fuel line of a fuel dispensing station wherein the device may be mounted anywhere in the line including adjacent the fuel dispensing nozzle and uncouple when the tensile force on the line is above a predetermined level.

It is yet a still further object of the present invention to provide a fuel line swivel joint connector having a quick disconnectable coupling device for uncoupling and shutting flow through the line when the tensile force due to a pull on the line is above a predetermined level, the device having means for resisting the hydrostatically generated forces of the fuel independently of means for resisting the tensile forces resulting from line pull such that the fuel generating forces and the tensile forces are not cummulative.

Accordingly, the present invention provides in a fluid fuel line, a combination swivel joint and quick disconnect or breakaway coupling device, the device having coupling means between first and second body members which swivel or rotatably pivot relatively to one another, the coupling means acting to connect the first and second body members together in flow communication with each other so that fluid may normally flow through the body members, the coupling having interconnectable means for decoupling the body members when an external tensile force applied to the fluid line is above a predetermined level, and valve means for shutting flow communication between the body members when they are decoupled.

The coupling means may include recouplable infrangible or replaceable frangible detent means which in either case normally secures interlockable portions of the body members together and permits them to separate when the predetermined external load exerted on the line is exceeded. The infrangible detent means may comprise biased detent elements forced out of normally seated dispositions by the action of the exceeded tensile load, while the frangible means may merely be a breakable member for permitting separation of the body members.

The body members slidably mate with the detent means acting to releasably secure them together, the slidable mating preferably being through an interconnecting joint such as a dado joint including interlocking members such as tongue and groove or tenon and mortise elements, the sliding plane being substantially aligned with the direction of the externally impressed tensile force vector.

Another aspect of the invention is the provision of coupling such disconnectable body members, whether or not the mating is by means of a swivel joint, such that the direction in which they separate is disposed at an inclination to the direction of the fluid or hydrostatically generated forces, the inclination preferably being substantially normal, and additionally the interconnecting joint is disposed such that the coupling resists the hydrostatic forces so that the hydrostatically generated forces do not affect the decoupling of the body members which thereby decouples only as a result of the externally presented tensile forces. Preferably such joint is a swivel joint.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENTS

Figure 1:
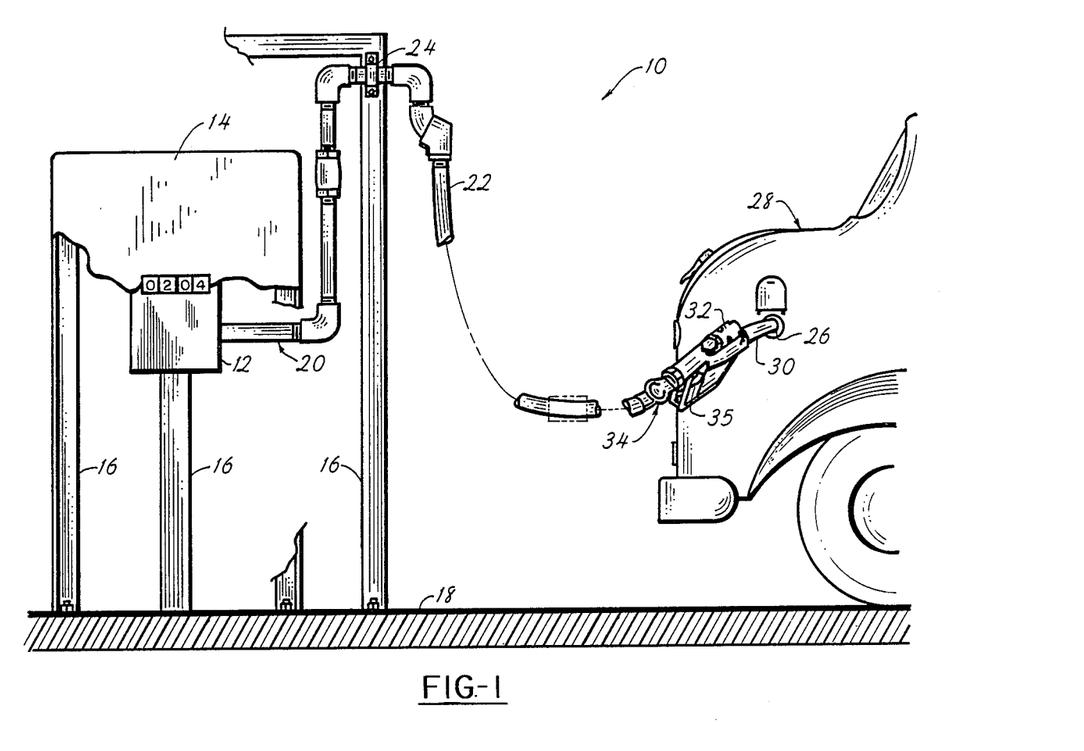
FIG. 1 is an elevational view of a portion of an automobile at a fuel dispensing station illustrating fuel being dispensed into the automobile from pumping apparatus having a fuel delivery line incorporating a first embodiment of a detachable swivel connector constructed in accordance with the principles of the present invention.

Referring now to the drawings, a disconnectable coupling accrding to the present invention may be utilized in connection with the fuel dispensing facilities of various types especially those fuel dispensing stations which dispense gasoline and diesel fuel to the public. Other dispensing facilities, such as those located, for example, on farms, industrial plants, mines etc., may also be facilities where the apparatus may be utilized. However, for disclosure purposes the present invention will be described in conjunction with fuel dispensing stations located at service stations. Thus, as illustrated in FIG. 1 a dispensing station generally indicated at 10 includes measuring apparatus 12 adapted to receive and measure pressurized fluid fuel, such as gasoline and fuel oil, pumped from a remotely located storage tank through underground piping (not illustrated), the pumping equipment being adapted to be manually actuated by an operator using the facility. The measuring equipment is generally mounted within a cabinet 14 or the like secured to structural framework such as members 16 anchored by conventional means to an island on which the dispensing station is supported or to the ground 18.

Metered fuel exits the measuring equipment after being pumped thereto and from there conventionally flows through piping generally indicated at 20 comprising various conventional piping couplings, nipples, fittings and other conventional connecting members which convey the fuel from the measuring equipment to a flexible hose 22. Adjacent the connection with the hose, and intermediate that location and the measuring equipment, the piping 20 is anchored by conventional anchoring means 24 to a structural support, which may be part of the structural framework 16. The anchoring means 24 secures the piping and resists the external loads which may be placed on the various components to thereby resist damage to those components and the measuring apparatus 12. The flexible hose 22 is of a conventional re-enforced construction as approved by the appropriate regulatory bodies, and may be of an convenient size and length to permit an operator to easily reach the fuel tank inlet 26 of a vehicle 28 for insertion therein of the spout 30 at the end of a dispensing nozzle 32, the nozzle being connected in flow communication with the hose 22 either directly or by means of a swivel connector, which preferably may be a detachable swivel connector 34 constructed in accordance with the principles of the present invention. Conventionally, the nozzle includes valving in the fluid passageway in the body thereof, the valving being controlled by an adjustment trigger 35 biased to close the valving and operable to open the flow passageway upon depression or squeezing by the operator.

Under normal conditions, a vehicle operator will drive his or her vehicle 28 adjacent the fuel dispensing station 10, and then either an attendant or the operator will remove the nozzle 32 from a storage location on the cabinet 14, turn on the pumping equipment, insert the nozzle spout 30 into the inlet to the vehicle fuel tank, and squeeze the trigger 35 to dispense the fuel. When the dispensing operation is completed, the individual is expected to remove the nozzle spout from the fuel tank inlet, turn off the pumping equipment and replace the nozzle on the cabinet. After paying for the fuel received, the vehicle operator will drive the vehicle from the premises. Occasionally, a vehicle may be driven from the proximity of the dispensing station 10 without first removing the nozzle spout 30 from the fuel tank inlet 26. This may occur for a number of reasons, and is not necessarily limited to individual operators pumping their own gas, but could occur as a result of a driver of a large truck not being able to see the station attendant and believing the fueling process to be completed. When this occurs forces are generated at the nozzle which may dislodge and damage the measuring equipment 12, the forces generated at the nozzle being tensile forces which are transmitted through the hose 22 to the piping and resisted by the anchoring means 24. However, when such forces exceed that for which the anchoring means is capable of withstanding, damage to the measuring equipment 12 as well as the various components of the piping may result. Additionally, when such damage occurs the highly combustible fuel may be spilled resulting in a potential fire hazard and additional environmental hazards.

As aforesaid, the prior art has recognized this problem and has endeavored to provide solutions thereto. However, the decouplers of the prior art as heretofore described have had deficiencies. Accordingly, a significant aspect of the present invention is a provision of a combination swivel joint and quick disconnect device 34, hereinafter referred to as a "detachable swivel device." The detachable swivel device may be interposed between two conduit sections and secured in flow communication therewith. For example, the detachable swivel device 34 may be disposed between the hose 22 and the nozzle 32 thereby serving as a detachable and flexible nozzle swivel, or alternatively it may be interposed between various sections of the hose or between the piping and the hose to thereby serve as a detachable and flexible hose swivel.

Figure 2:
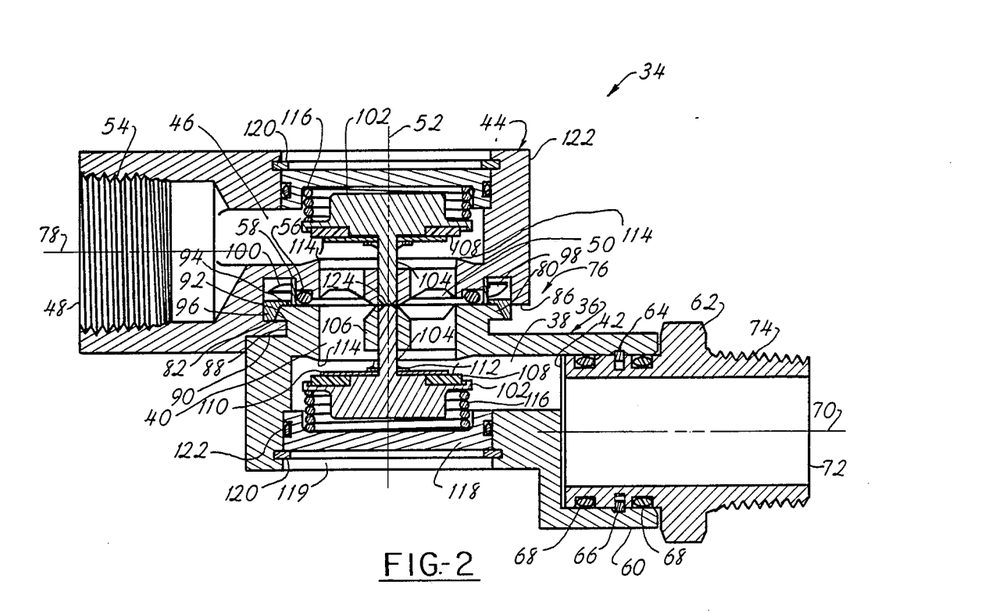
FIG. 2 is a vertical cross-sectional view taken substantially through the longitudinal cente of the detachable swivel connecto disclosed in FIG. 1.
Figures 3, 10, 11:
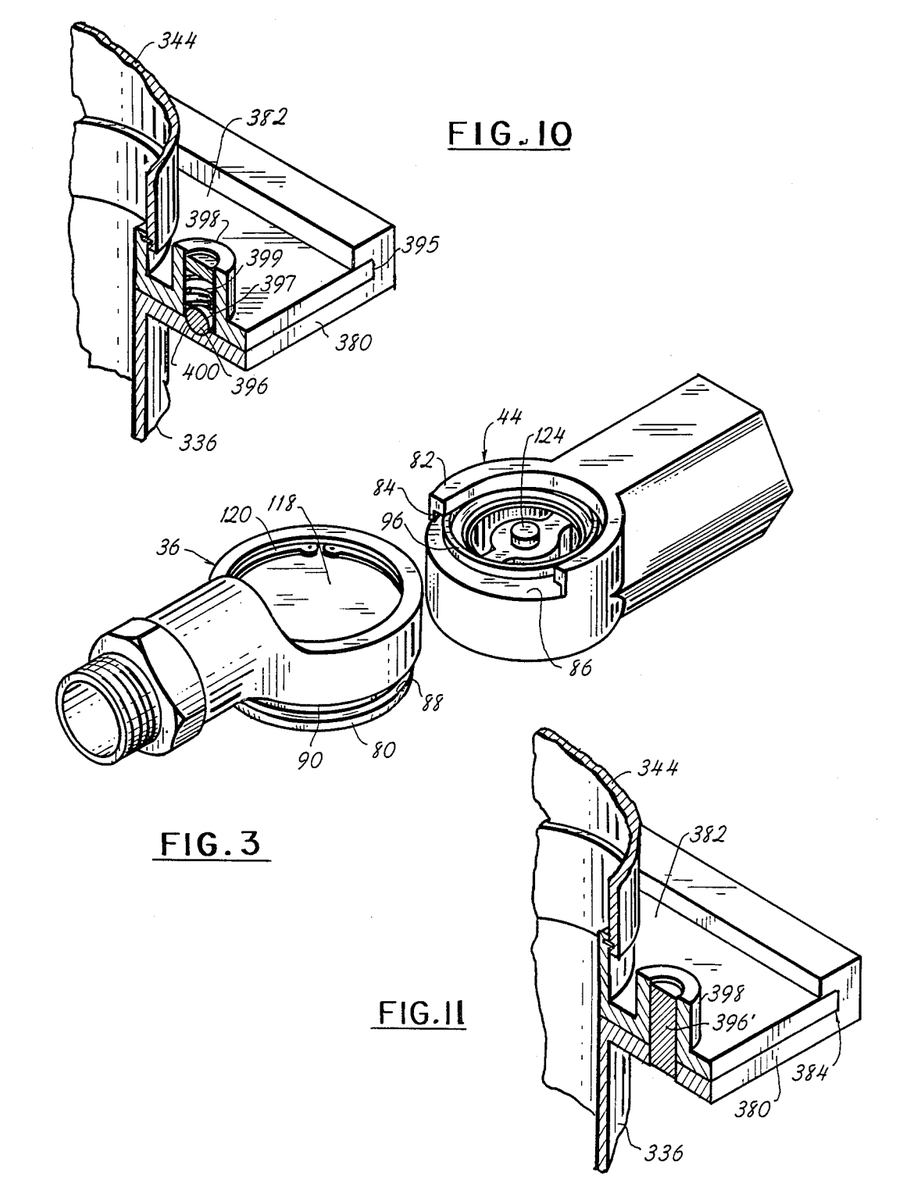
FIG. 3 is a perspective view of the apparatus illustrated in FIG. 2, but rotated 180° about the longitudinal axis.
FIG. 10 is an enlarged perspective view through the embodiment illustrated in FIG. 9 with portions thereof broken away to illustrate certain of the details.
FIG. 11 is a view similar to FIG. 10, but of a modification thereof.

As illustrated in FIGS. 2 and 3, the preferred form of the detachable swivel device 34 comprises a first body member 36 defining a fluid passageway 38 therein, the passageway 38 having an inlet 40 and an outlet 42. The detachable swivel additionally includes a second body member 44 defining a fluid passageway 46 therein which communicates fluid from an inlet 48 to an outlet 50. As hereinafter described the outlet 50 of the body member 44 is mounted in flow communication with the inlet 40 of the body member 36 by means of a pivotable connection such that the body members 36 and 44 may swivel or rotate relative to each other about an axis of rotation 52. The inlet 48 is adapted to be connected by conventional means such as threads 54 in flow communication with a conduit member which may be a coupling (not illustrated) attached, in the preferred embodiment, to the hose 22. One or more fluid seals 56 of conventional design such as "O" rings suitable for maintaining flow communication between the outlet 50 of the body member 44 and the inlet 40 of the body member 36 may be provided when the body members are in the coupled or operative disposition to preclude leakage as the body members 36 and 44 rotate relative to one another, a retaining member 58 acting to hold the "O" ring seal 56 in place.

The outlet 42 of the first body member 36 is disposed internally within an annulus 60 formed at the exit end of the body member 36, and may be connected to a coupling 62 for communicating the fluid fuel therethrough. Preferably, the connection between the coupling 62 and the first body member 36 is by means of a second swivel joint. For example, as preferred, the coupling 62 is a male member received within the annulus 60 and rotatably connected thereto by means of an annular spring type detent member 64 which is disposed within a recess 66 formed internally in the wall of the annulus 60. A pair of fluid seals such as "O" rings 68 preclude leakage as the body member 36 and coupling 62 swivel or rotate relative to each other about the longitudinal axis 70 of the coupling 62. Thus, in the preferred embodiment of FIGS. 2 and 3 the inlet 48 of the body member 44 and the outlet 72 of the coupling 62 may revolve in two planes relative to each other about the respective axis of rotation 52 and 70, these axes being inclined substantially normal to each other. The outlet section of the coupling 62 is adapted, by conventional means such as threads 74 to be connected in flow communication with a conduit member, such as a portion of the hose 22, or if desired, directly to the inlet to the nozzle 32 as illustrated in FIG. 1.

In order to couple the first and second body members 36, 44 together in flow communication and to uncouple them when an extraneous force in excess of a predetermined level is applied so as to terminate flow communication, interconnectable means generally indicated at 76 is provided, such means permitting the body members to rotate relative to each other about the axis 52 when coupled and to forcibly uncouple by sliding apart due to the extraneous tensile force being applied between the coupling 74 and the first body member along a line of action with respect to the axis 70 and the axis 78 of the inlet 48. The interconnectable means 76 comprises interlocking members 80 and 82 formed on the first and second body members 36, 44 respectively. These interlocking members are constructed in a mortise and tenon fashion in the sense that member 80 is received within a dado slot 84 formed in step fashion between the member 82 and a surface 86 of the body member 44, the member 80 additionally including a lip 88 spaced from a ledge 90 formed on the body member 36, and the member 82 is received within the space between the lip 88 and the ledge 90. As illustrated in FIGS. 2 and 3, the interlocking member 82 is an arcuate substantially semi-circular segment formed about the axis 52 at the fluid outlet 50 of the body member 44. The interlocking member 80 is an annular segment formed about the fluid inlet 40 in the body member 36, the center of the annulus being the axis 52 when the first and second body members are coupled. The interlocking members 80 and 82 thus have corresponding surfaces which interface together when th first and second body members are slidably juxtaposed into coupling engagement, and may rotate relative to one another when so coupled.

The annular wall 92 of the interlocking member 80 has a conically tapered form, the taper being from the lip 88 to the outer surface 94 spaced from the lip remote from the ledge 90. When the members 80 and 82 are joined, the conically tapered portion of the member 80 interfaces with a correspondingly tapered internal portion of an annular detent ring 96, the detent ring being urged into engagement with the member 80 by means of a preloading biasing wave spring 98. The detent ring 96 and the spring 98 are received within a well or recess 100 formed in the body member and opening ont the dado adjacent the ledge 86. When so held the member 80 is prevented from moving relative to the member 82 in the direction of disengagement, while the conically tapered wall portion 92 of the member 80 ma rotate within the cooperating surface of the detent ring 96, the latter also acting as a bearing surface for such rotation. Preferably the angular taper should be in the order of approximately 18° to 30° with respect to the axis 52. Thus, an infrangible release is provided by the cooperation of the interlocking members and the detent ring, the release acting to uncouple the body members 36 and 44 upon the application of a tensile load in excess of a predetermined level in the direction of disengagement.

When a load beyond that for which the coupling is designed is exerted on the fuel line the resolved forces generated at the inclined or tapered coacting surfaces of the member 80 and the detent ring 96 produce a force component in a direction substantially parallel to the axis 52. This force is resisted by the friction between the member 80 and the detent ring, by the friction between the detent ring and the annular well or recess 100 and by the bias force of the spring 98. When the cummulative total of the resisting forces is exceeded, the detent ring 96 is forced into the annular well 100 away from the member 80 of the body member 36. This thereby frees the interlocking members 80, 84 to disengage from one another thereby permitting the interlocking members to move from axial alignment with each other and separate so that the body members 36 and 44 uncouple. Thus, if, for example, the vehicle 28 drives away from the fuel dispensing station with a nozzle spout 30 within the inlet 26 of its fuel tank, the tensile force generated on the fuel line will exceed the predetermined level and the body members 36 and 44 will separate.

The infrangible release provided may subsequently be re-engaged to again couple the body members 36 and 44. The recoupling may occur by depressing the detent ring 96 into the recess 100 against the action of the spring 98, and thereafter reinserting the member 80 into the dado slot 84 until the members 80 and 82 again interlock, at which time the detent ring 96 is again forcibly urged into contact with the interlocking means 80 and the conically tapered portions are again seated.

Valving means are provided in each of the body members 36, 44, which valving means are disposed to maintain the inlet 40 of the body member 36 and the outlet 50 of the body member 44 in flow communication with each other when the body members are coupled together, yet close the respective passageways when the body members are uncoupled. In regard to the body member 36, a valve head 102 is positioned in the passageway 38, the valve head being formed with or connected to a cylindrical stem 104 extending through the inlet 40 substantially coaxed with the axis 52 toward the body member 44 when coupled thereto, the stem 104 being disposed within a bore in a central hub portion within the inlet 40 of the body member 36. The valve head includes an annular gasket 108 tightly held in place by a retaining ring 110 secured in place by a retaining lock washer 112 disposed about the stem 104. The gasket 108 may seat against a valve seat 114 formed about the periphery of the discharge end of the inlet 40 when a spring 116 disposed about the valve hed 102 remote from the gasket 108 urges the valve in the seating direction. The spring 116 preferably is a coil spring disposed between the valve head remote from the seating gasket and a recess in a cap 118 positioned within a cavity 119 formed in the body member 36, opposite the inlet 40, the cap being precluded from displacement out of the cavity by means of a retaining ring 120, while an "O" ring 122 acts as a seal to prevent fluid leakage past the cap. Similar valving is disposed within the body member 44, and for purposes of disclosure the same reference numbers are applied to the identical parts, the only difference being in that the valving associated with the body member 44 is in the outlet 50 of the passageway 46.

In the uncoupled position of the body members 36, 44 the respective valves are seated against the respective valve seats 114 to close the respective passageways. Thus, when the body members uncouple, fuel is precluded from flowing from the outlet of the body member 44, and also back flowing through the inlet of the body member 36. The valve stems 104 each has a free end 124 which, when the body members 36 and 44 are uncoupled project outwardly from the respective passageway, as illustrated in FIG. 3. When the members are coupled together the free ends 124 abut each other to hold the respective valve heads 102 in the open position away from the respective valve seat 114.

Figures 4, 7, 8, 12:
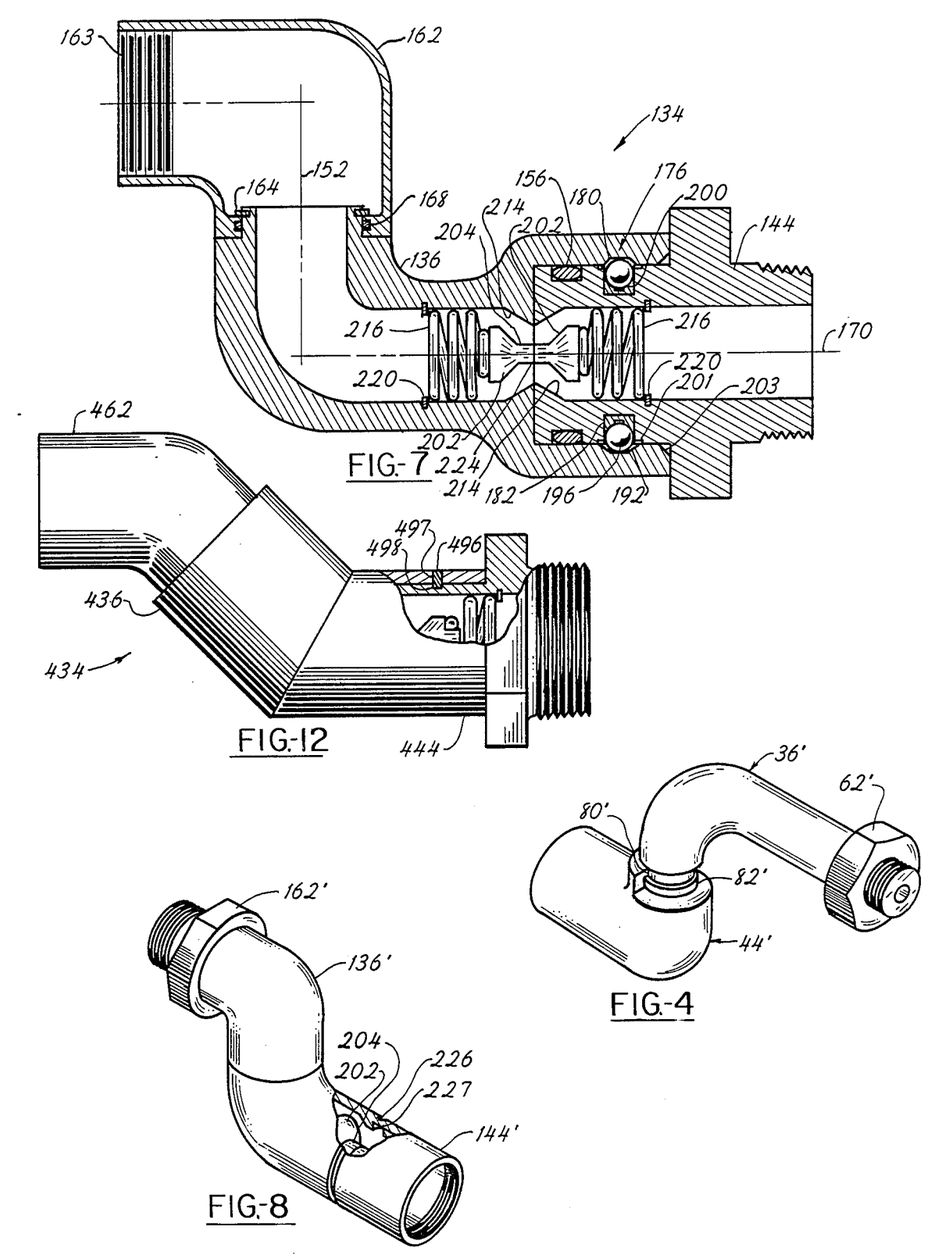
FIG. 4 is a perspective view of an alternate form of the first embodiment.
FIG. 7 is a view similar to FIG. 2 taken longitudinally through a second embodiment of apparatus constructed in accordance with the present invention.
FIG. 8 is an alternate construction of the second embodiment ilustrated in FIG. 7.
FIG. 12 is an elevational view with portions thereof broken away illustrating another embodiment of the present invention.

In the preferred embodiment illustrated in FIGS. 2 and 3 the interlocking member 82 as aforesaid has a semicircular configuration and is adapted to accept the correspondingly curved but fully circular interlocking member 80 of the first body member 36. It will be recognized by those skilled in the art that loads generated at the nozzle 32 by a vehicle 28 leaving the proximity of the fuel dispensing station are transmitted in tension by the hose 22. In the preferred embodiment as illustrated in FIGS. 2 and 3 the hose is attached to the inlet 48 of the body member 44. Therefore, loads producing detachment of the interconnectable means 76 are directed axially to the second body member 44 in a direction substantially parallel to the axis 78 away from the axis 52. Consequently, it is preferred that the interlocking member 82 be semicircular in configuration and that the interlocking member 80 of the body member 36 be circular so that tensile forces sufficient to produce detachment of the interlockable means 76 are exerted in the direction parallel to the axis 78 and away from the axis 52 to separate the body members regardless of how the member 44 is positioned in relation to the body member 36. In an alternate form of the first embodiment as illustrated in FIG. 4 the interlocking member 82' of the body member 44' is circular and is adapted to detachably accept a correspondingly curved semicircular interlocking member 80' of the body member 36. Thus, the equivalent but reverse of that illustrated in FIGS. 2 and 3 is included within the invention, albeit the advantages are reduced.

As aforesaid, the hydrostatic forces in the prior art coupling devices are exerted in the same direction as the tensile force on the fuel line, and therefore so is the spike line pressure shock when the nozzle trigger is snapped-off. On the other hand, in the present invention the hydrostatically produced forces comprising internal pressure and shock line forces are directed substantially perpendicular to the direction of the tensile force due to a pull on the hose since the hydrostatically produced forces are generated in a direction parallel to the axis 52 since fluid flows between the outlet 50 of the body member 44 into the inlet 40 of the body member 36. This direction of flow through the coupling between the first and second body members tends to prevent disengagement of the interconnectable means 76. In other words, the interconnectable means resists the hydrostatically generated forces and only disengage or uncouple by the action of the excessive tensile forces transmitted when an excessive pull is exerted on the fuel line.

Figure 5:
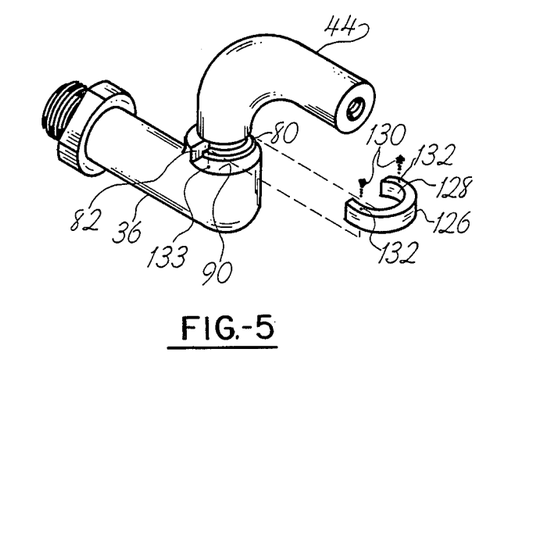
FIG. 5 is a perspective view of another alternate construction of the first embodiment.

An alternate form of the detachable swivel device of the device illustrated in FIGS. 2 and 3 is disclosed in FIG. 5 wherein a frangible or breakaway connection is provided. Here, a frangible release in the form of a bearing member 126 of a substantially half ring or semicircular annular form having an internal surface 128 is adapted to be positioned about the interlocking member 80 on the body member 36. The member 126 is attached to the body 36 by breakaway or frangible members in a form of pins 130 which are inserted through corresponding bores 132 in the half ring 126 are receivable within corresponding recesses 133 in the ledge 90 of the body member 36. The connection between the interconnectable members 80 and 82 are similar to that in FIGS. 2 and 3, and the half ring 126 interfaces therewith in dado fashion acting as a bearing for the interconnectable member 80 as the body members 36 and 44 pivot relatively to each other. When a force in excess of the shear force which can be supported by the pins 130 is applied to the body member 44 relatively to the reactive force on the body member 36, the members 130 frangibly detach by shearing This action releases the semicircular ring member 126 and permits the interlocking members 80 and 82 to slidably disengage.

Figure 6:
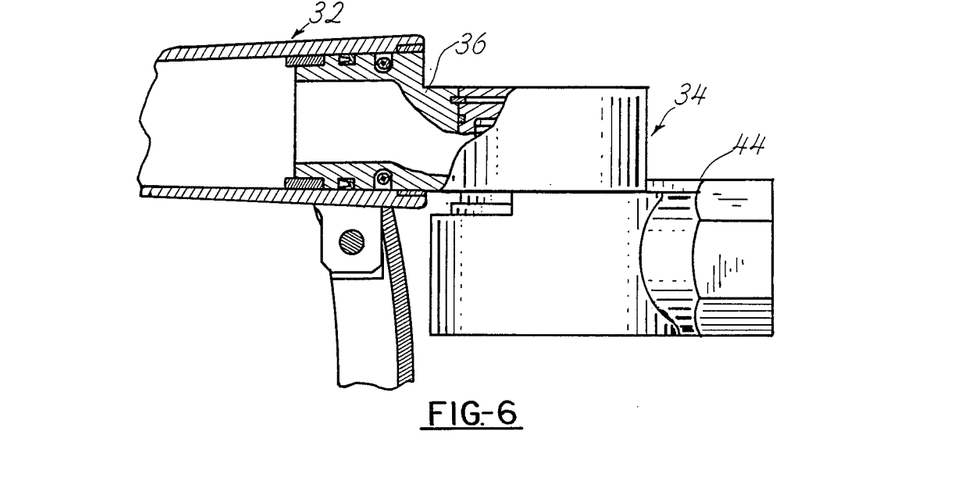
FIG. 6 is a cross-sectional view taken substantially through an alternate adaptation of the first embodiment.

In the alternate construction of the first embodiment illustrated in FIG. 6 the coupling member 62 is deleted and the body member 36 is directly connected to another component of the fuel line, which as illustrated may be the nozzle 32. Thus, it can be seen that the present invention may be utilized in conjunction with a single axis swivel connection, and even married directly to the nozzle, a marriage not available in the prior decoupling devices since they had no means provided for swiveling one coupled member to the other.

A second embodiment of a detachable swivel device 134 incorporating certain of the aspects of the first embodiment is illustrated in FIG. 7, in the detachable swivel device 134 comprising body members 136 and 144. The body member 136 may be pivotably connected to a coupling 162 which may be connected by threads or the like 163 at one end to the hose to form the inlet, or may be attached directly or indirectly to the nozzle 32, in which case it would be the outlet of the device 134. The other end of the coupling 162 may be rotatably connected to the body member 136 by means of an annular spring type detent 164, while at least one "O" ring 168 provides a fluid seal The body member 136 and 144 are rotatably connected together by interconnectable means generally indicated at 176, such means comprising corresponding interlocking members 180 in the body member 136 and 182 in the body member 144.

The interlocking means 182 includes a plurality of spherical detent members 196, i.e., balls which are disposed in seats 200 positioned within an annular groove formed in the body member 144. The balls 196 are held by a retaining ring 201 having an annular cylindrical configuration including circular apertures of sufficient size to allow the balls 196 to project, but insufficient to permit the balls to pass through. The balls are biased out of the seats 200 into an annular groove forming the interlocking member 180 in the body 136. Preferably the seats 200 are of a cast elastomer material which positions the balls and biases them outwardly, or other biasing means may be provided. When the body members 136 and 144 are connected, the balls 196 are forcibly held in the groove 180 permitting rotation of the body member 144 relative to the body member 136 but precluding movement of the body members relative to each other along the axis 170 until the axial force applied on the fuel line exceeds the design load which forces the balls 196 into the seat 200. The configuration of the groove 180 is such that there is an inclined or tapered surface 192 at the end of the groove remote from the body member 136, i.e., the end toward which the balls engage when the force is such that the body members separate. When the design load is exceeded the surface 192 acts as a cam against the balls to force the balls totally within the seat 200 allowing the body members 136 and 144 to separate. Thus, an infrangible release is provided by the cooperation of the interlocking members.

In order to recouple the body members 136 and 144 after separation, a conically inclined surface 203 at the end of the body member 136 permits the body member 144 to be reinserted by cntacting and camming the balls to force them into the seats 200 allowing the balls to re-enter the grooves and interlock after the body members 136, 144 are repositioned to the operative coupled position.

Each of the body members 136 and 144 includes a valve head 202 adapted to seat against a corresponding valve seat surface 214 by the action of a spring 216 held in the respective body member by detent rings 220 in a similar manner to the valving means in the embodiment of FIGS. 2 and 3. Again, a stem 204 on each valve is forced outwardly beyond the interfacing surface, the free ends of each valve abutting when the members are coupled and acting to open the valves when the body members 136 and 144 are recoupled after detachment.

An alternate construction to that illustrated in FIG. 7 is depicted in FIG. 8 wherein a frangible detachment is disclosed. Here, the frangible uncoupling means comprises an annular groove 226 formed in the external surface of the body member 144' and may also include another annular groove 227 formed in the interior wall so that a discontinuity adapted to concentrate stresses there at is formed. Thus, a Weakened section subject to stress concentration which is detachably frangible when a tensile force applied axially of a magnitude sufficient to sever the material intermediate the grooves 226 and 227 is applied on the fuel line. In all other respects the devise illustrated in FIG. 8 is identical to that illustrated in FIG. 7, except that here the disposition of the inlet and the outlet is reversed in that fuel enters the body member 144' and flows out through the coupling 162', although the positional relationship may be reversed.

Figure 9:
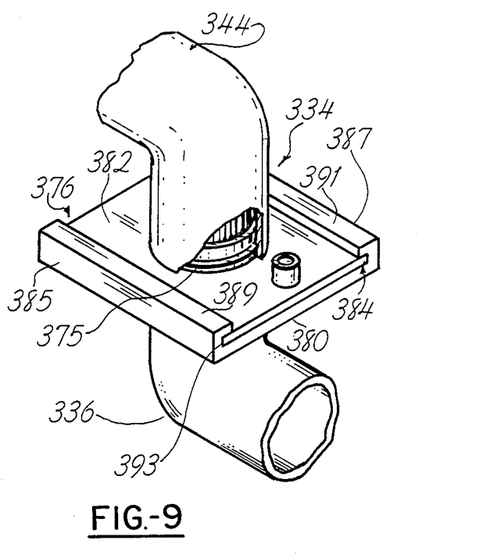
FIG. 9 is a fragmentary perspective view of a third embodiment of the present invention.

In FIGS. 9 and 10 another embodiment of the present invention is illustrated. Here the detachable swivel 334 includes interconnectable means 376 between the inlet of the body member 344 and the body member 336, the interconnectable means however comprising a nonrotatable coupling. The coupling includes a first interlocking member 380 secured to the body member 336, and a second interlocking member 382 fixedly attached to a connector 375. Preferably the connector 375 is rotatably connected to the body member 344 to provide a detachable swivel device, but may be fixed to the body member 344 and yet provide a detachable connector which resists separation due to hydraulically generated forces according to an important aspect of the invention.

As illustrated, the interlocking members 380 and 382 are slidable relatively to one another by means of a dado joint 384. The member 380 is a substantially planar plate member having upstanding walls 385, 387 at opposite side borders thereof extending substantially parallel to the direction in which the axial force would be applied when a pull is exerted on the fuel line. The upstanding walls 385, 387 have respective ledges 389, 391 extending from the upper ends thereof, which ledges are directed toward each other so as to overlay the planar plate portion of the member 380 so as to provide a respective pair of grooves 393, 395. The interlocking member 382 is another plate member disposed on the member 380 and held in place against movement normal to the direction of the axial force applied on the fuel line by means of the ledges 389, 391 of the dado joint 384 so provided. The coupling, however, can be disengaged in the direction of the axial pull when the tensile force applied therein is above the predetermined limit.

The coupling and uncoupling of the interconnectable members 380, 382 in the axial direction of the tensile force is provided by a detent ball 396 held in a retainer 397 carried within a small upstanding hollow cylindrical housing 398 fixedly attached to the member 382. The ball 396 is biased by means of a spring 399 into a recess 400 formed in the member 380 at a location such when that the ball is received within the recess the body members 336 and 344 are in flow communication with each other. The infrangible detent coupling formed by the ball 396 and the recess 400 is adapted to be released to uncouple the body members 336 and 344 when the tensile load applied on the fuel line exceeds the predetermined limit. Specifically, when the tensile load exerted in the direction substantially parallel to the dado grooves 393, 395 exceeds the predetermined load limit the ball 396 is forcibly urged from the recess 400 by the camming action therebetween, and when the bias force of the spring 399 is overcome the interlocking members 380 and 382 slidably separate.

In. FIG. 11 a construction similar to that illustrated in FIGS. 9 and 10 is depicted, but rather than an infrangible coupling a frangible coupling is provided between the interlocking members 380 and 382. This frangible connection is provided by a break-away pin or the like 396'. When in place the pin 396' couples the interlocking members together, and when a tensile force in excess of the shear strength of the pin is applied on the fuel line, the pin will shear and permit the body members 336 and 344 to separate.

Although not illustrated in FIGS. 9 through 11, valving such as that illustrated in the other embodiments is interposed in the body members 336 and 344 in a similar manner to that previously described. Accordingly, since the tensile force is directed substantially normal to the hydrostatically produced forces in the apparatus illustrated in this embodiment, tensile force alone will act to separate the body members, and the dado joint formed between the interlocking members 380 and 382 resists the hydrostatically produced forces in a manner similar to that of a first embodiment.

Another embodiment of the device of the present invention is illustrated in FIG. 12, the detachable swivel device 434 being similar to the device illustrated in FIG. 7 except as hereinafter explained. The device 434 has the axis of the body members 436 and 444 at an acute angle toward one another so that a swivel arrangement suitable for use in limited space conditions is provided. Additionally, a frangible detent ring 496 is fixedly held in a recess 497 in the body member 436 and extends therethrough into an annular recess 498 on the outer periphery of the body member 444. When the body members 436 and 444 are coupled together in this manner, they are free to rotate relatively to one another but prevented by the frangible ring 496 from separating axially until an axially directed tensile force sufficient to shear the member 496 is applied in the line between the body member 444 and the coupling 462. Of course, similar valving means is disposed internally within the members 436 and 444 as in the other embodiments so that upon separation of the members 436 and 444 flow of fuel is sealingly terminated.

Accordingly, quick disconnect and swivel joint apparatus is provided which fulfills the objects stated. Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. In a fuel dispensing system including a liquid fuel dispensing station for receiving fuel from a remote location and supplying fuel to a supply conduit, a flexible fuel line operatively connected in flow communication to said conduit, and a nozzle including operator actuating means operatively connected to said fuel line, a detachable safety device connected in said fuel line intermediate said nozzle and said conduit for coupling portions of said line together and for uncoupling when an excessive tensile force is exerted externally on said fuel line, said device dcomprising first and second body members, each of said body members having a fluid passageway extending therethrough, each of said passageways having an inlet and an outlet, coupling means interconnecting said first and second body members together for pivotable movement about a pivot axis relatively to one another with the outlet of a first of said body members in flow communication with the inlet of the second of said body members to permit fuel to flow therethrough when said body members are coupled, locking means for locking said body members together when coupled and for unlocking said members when an external tensile force above a predetermined limit is applied to said fuel line to permit uncoupling of said body member, one of said body members including a coupling pivotably connected in flow communication to one of the inlet of said first body member and outlet of said second body member for rotation about an axis inclined relatively to said pivot axis and valve means in the fluid passageway of each body member for shutting flow communication between said body members when uncoupled.

2. In a fuel dispensing system as recited in claim 1, wherein said coupling means comprises a first interlocking member disposed about the outlet of said first body member and a second interlocking member disposed about the inlet of said second body member, an arcuate mortise slot formed in one of said interlocking members and a correspondingly configured arcuate tenon defined in the other of said interlocking members, said tenon being cooperatively received within said mortise when said body members are coupled.

3. In a fuel dispensing system recited in claim 2, wherein said locking means comprises an annular recess formed in the body member in which said mortise is defined and opening onto said slot, an annular detent ring disposed within said recess, and biasing means withnn said recess for urging said ring into engagement with said tenon at an angle inclined relatively to said tensile force.

4. In a fuel dispensing system as recited in claim 3, wherein said ring and said tenon have cooperating annular surfaces, and said surfaces are inclined relatively to said pivot axis.

5. In a fuel dispensing system as recited in claim 2, wherein said has a circular circumference and said mortise slot has a semi-circular cross sectional configuration.

6. In a fuel dispensing system as recited in claim 5, wherein said valve means comprises a valve head disposed in said outlet of said first body member and a valve head disposed in said inlet of said second body member, biasing means normally urging each valve to close the respective inlet and outlet, abutment means associated with each valve for protruding through the respective outlet and inlet when said body members are uncoupled and for forcibly abutting one another when said body members are coupled to overcome the urging of the respective biasing means to open the respective inlet and outlet.

7. In a fuel dispensing system as recited in claim 6, wherein each of said abutment means has a cylindrical configuraton and extends coincidentally with said pivot axis.

8. In a fuel dispensing system as recited in claim 7, wherein one of said body members includes a coupling pivotably connected in flow communciation to one of the inlet of said first body member and outlet of said second body member for rotation about an axis inclined relatively to said pivot axis.

9. In a fuel dispensing system as recited in claim 2, wherein said mortise slot has a circular circumference and said tenon has a semi-circular circumference.

10. In a fuel dispensing system as recited in claim 2, wherein said locking means comprises frangible breakaway means, said breakaway means including a segmental locking ring holding said tenon in said mortise slot, and shear pins securing said locking ring to one of said body member, said shear pins having body members, said shear pins having an axis disposed substantially parallel to said pivot axis.

11. In a fuel dispensing system as recited in claim 1, wherein said valve means comprises a valve head disposed in said outlet of said first body member and a valve head disposed in said inlet of said second body member, biasing means normally urging each valve to close the respective inlet and outlet, abutment means associated with each valve for protruding through the respective outlet and inlet when said body members are uncoupled and for forcibly abutting one another when said body members are coupled to overcome the urging of the respective biasing means to open the respective inlet and outlet.

12. In a fuel dispensing system as recited in claim 11, wherein each of said abutment means has a cylindrical configuraton and extends coincidentally with said pivot axis.

13. In a fuel dispensing system including a liquid fuel dispensing station for receiving fuel from a remote location and supplying fuel to a supply conduit, a flexible fuel line operatively connected in flow communication to said conduit, and a nozzle including operator actuating means operatively connected to said fuel line, a detachable safety device connected in said fuel line intermediate said nozzle and said conduit for coupling portions of said line together and for uncoupling when an excessive tensile force is exerted externally on said fuel line, said device comprising first and second body members, each of said body members having a fluid passageway extending therethrough, each of said passageways having an outlet and an inlet, coupling means interconnecting said first and second body members together with the outlet of one of said body members in flow communication with the inlet of the other of said body members to permit fuel to flow therethrough when said body members are coupled, said coupling means having respective interlocking elements associated with each body member permitting sliding of said body members relatively to one another into and out of coupling engagement in a direction inclined relative to the direction fluid flows through said inlet and said outlet, said interlocking elements being disposed relatively to said inlet and said outlet for resisting uncoupling in the direction fluid flows through said inlet and said outlet, locking means for locking said body members together when coupled and for unlocking said members when an external tensile force above a predetermined limit is applied to said fuel line to permit uncoupling of said body members, and valve means in the fluid passageway for each body member for shutting flow communication between said body members when uncoupled.

14. In a fuel dispensing system as recited in claim 13, wherein said coupling means comprises a first interlocking member disposed about the outlet of said first body member and a second interlocking member disposed about the inlet of said second body member, an arcuate mortise slot formed in one of said interlocking members and a correspondingly configured arcuate tenon defined in the other of said interlocking members, said tenon being cooperatively received within said mortise when said body members are coupled.

15. In a fuel dispensing system as recited in claim 14, wherein said locking means comprises an annular recess formed in the body member in which said mortise is defined and opening onto said slot, an annular detent ring disposed within said recess, and biasing means within said recess for urging said ring into engagement with said tenon at an angle inclined relatively to said tensile force.

16. In a fuel dispensing system as recited in claim 15, wherein said ring and said tenon have cooperating annular surfaces, and said surfaces are inclined relatively to said pivot axis.

17. In a fuel dispensing system as recited in claim 13, wherein said valve means comprises a valve head disposed in said outlet of said first body member and a valve head disposed in said inlet of said second body member, biasing means normally urging each valve to close the respective inlet and outlet, abutment means associated with each valve for protruding through the respective outlet and inlet when said body members are uncoupled and for forcibly abutting one another when said body members are coupled to overcome the urging of the respective biasing means to open the respective inlet and outlet.

18. In a fuel dispensing system as recited in claim 17, wherein each of said abutment means has a cylindrical configuration and extends coincidentally with said pivot axis.

19. In a fuel dispensing system as recited in claim 13, wherein one of said body members includes a coupling pivotably connected in flow communication to one of the inlet of said first body member and outlet of said second body member for rotation about an axis inclined relatively to said pivot axis.

20. A fuel dispensing system as recited in claim 14, wherein said tenon has a circular circumference and said mortise slot has a semi-circular cross sectional configuration.

21. In a fuel dispensing system as recited in claim 14, wherein said mortise slot has a circular circumference and said tenon has a semi-circular circumference.

22. In a fuel dispensing system as recited in claim 14, wherein said locking means comprises frangible breakaway means, said breakaway means including a segmental locking ring holding said tenon in said mortise slot, and shear pins securing said locking ring to one of said body member, said shear pins having body members, said shear pins having an axis disposed substantially parallel to said pivot axis.

23. In a fuel dispensing system as recited in claim 13, wherein said coupling means comprises a first interlocking member disposed about the outlet of said first body member and a second interlocking member disposed about the inlet of said second body member, an elongated mortise slot formed in one of said interlocking members and a correspondingly configured elongated tenon defined in the other of said interlocking members, said tenon being cooperatively received within said mortise when said body members are coupled.

24. In a fuel dispensing system as recited in claim 23, wherein said locking means comprises a ball contained in one of said first and second interlocking members, a recess formed in the other of said first and second interlocking members aligned with said ball when said body members are coupled, and biasing means for urging said ball into said recess once said body members are coupled.

25. In a fuel dispensing system as recited in claim 23, wherein said locking means comprises a frangible member interposed intermediate said first and second interlocking members.

26. In a fuel dispensing system including a liquid fuel dispensing station for receiving fuel from a remote location and supplying fuel to a supply conduit, a flexible fuel line operatively connected in flow communication to said conduit, and a nozzle including operator actuating means operatively connected to said fuel line, a detachable safety device connected in said fuel line intermediate said nozzle and said conduit for coupling portions of said line together and for uncoupling when an excessive tensile force is exerted externally on said fuel line, said device comprising first and second body members, each of said body members having a fluid passageway extending therethrough, each of said passageways having an inlet and an outlet, coupling means interconnecting said first and second body members together for pivotable movement about a pivot axis relatively to one another with the outlet of a first of said body members in flow communication with the inlet of the second of said body members to permit fuel to flow therethrough when said body members are coupled, said coupling means having respective interlocking elements associated with each body member permitting sliding of said body members relatively to one another into and out of coupling engagement and for permitting pivotable movement relatively to one another about an axis inclined relatively to the sliding direction, said interlocking elements being disposed relatively to said inlet and said outlet for resisting uncoupling in the direction fluid flows through said inlet and said outlet, locking means for locking said body members together when coupled and for unlocking said members when an external tensile force above a predetermined limit is applied to said fuel line to permit uncoupling of said body members, and valve means in the fluid passageway of each body member for shutting flow communication between said body members when uncoupled.

27. In fuel dispensing system as recited in claim 26, wherein said coupling means comprises a first interlocking member disposed about the outlet of said first body member and a second interlocking member disposed about the inlet of said second body member, an arcuate mortise slot formed in one of said interlocking members and a correspondingly configured arcuate tenon defined in the other of said interlocking members, said tenon being cooperatively received within said mortise when said body members are coupled.

28. In a fuel dispensing system as recited in claim 27, wherein said locking means comprises an annular recess formed in the body member in which said mortise is defined and opening onto said slot, an annylar detent ring disposed within said recess, and biasing means within said recess for urging said ring into engagement with said tenon at an angle inclined relatively to said tensile force.

29. In a fuel dispensing system as recited in claim 28, wherein said ring and said tenon have cooperatively annular surfaces, and said surfaces are inclined relatively to said pivot axis.

30. In a fuel dispensing system as recited in claim 27, wherein said valve means comprises a valve head disposed in said outlet of said first body member and a valve head disposed in said inlet of said second body member, biasing means normally urging each valve to close the respective inlet and outlet, abutment means associated with each valve for protruding through the respective outlet and inlet when said body members are uncoupled and for forcibly abutting one another when said body members are coupled to overcome the urging of the respective biasing means to open the respective inlet and outlet.

31. In a fuel dispensing system as recited in claim 30, wherein each of said abutment means has a cylindrical configuration and extends coincidentally with said pivot axis.

32. In a fuel dispensing system as recited in claim 27, wherein one of said body members includes a coupling pivotably connected in flow communication to one of the inlet of said first body member and outlet of said second body member for rotation about an axis inclined relatively to said pivot axis.

33. A fuel dispensing system as recited in claim 28, wherein said tenon has a circular circumference and said mortise slot has a semi-circular cross sectional configuration.

34. In a fuel dispensing system as recited in claim 28, wherein said mortise slot has a circular circumference and said tenon has a semi-circular circumference.

35. In a fuel dispensing system as recited in claim 28, wherein said locking means comprises frangible breakaway means, said breakaway means including a segmental locking ring holding said tenon in said mortise slot, and shear pins securing said locking ring to one of said body member, said shear pins having body members, said shear pins having an axis disposed substantially parallel to said pivot axis.

36. In a fuel dispensing system as recited in claim 26, wherein said coupling means comprises a first interlocking member disposed about the outlet of said first body member and a second interlocking member disposed about the inlet of said second body member, an elongated mortise slot formed in one of said interlocking members and a correspondingly configured elongated tenon defined in the other of said interlocking members, said tenon being cooperatively received within said mortise when said body members are coupled.

37. In a fuel dispensing system as recited in claim 36, wherein said locking means comprises a ball contained in one of said first and second interlocking members, a recess formed in the other of said first and second interlocking members aligned with said ball when said body members are coupled, and biasing means for urging said ball into said recess once said body members are coupled.

38. In a fuel dispensing system as recited in claim 36, wherein said locking means comprises a frangible member interposed intermediate said first and second interlocking members.

* * * * *

UNITED STATES PATENT AND TRADEMARK OFFICE
CERTIFICATE OF CORRECTION

PATENT NO. : 4,779,638

DATED : October 25, 1988

INVENTOR(S) : Leonard R. Nitzberg & Paul D. Carmack

It is certified that error appears in the above-identified patent and that said Letters Patent is hereby corrected as shown below:

```
column 12, line 45, change "dcomprising" to
comprising --
column 12, line 59, change "member" to -- members --
column 13, line 22, after "said"(1st occurr.) insert
tenon --
column 13, line 14, please change "withnn" to
-- within --
```

Signed and Sealed this

Second Day of May, 1989

Attest:

DONALD J. QUIGG

Attesting Officer

Commissioner of Patents and Trademarks